(12) United States Patent
Vongsouvanh et al.

(10) Patent No.: US 9,727,577 B2
(45) Date of Patent: Aug. 8, 2017

(54) SYSTEM AND METHOD TO STORE THIRD-PARTY METADATA IN A CLOUD STORAGE SYSTEM

(71) Applicant: Google Inc., Mountain View, CA (US)

(72) Inventors: Alain Vongsouvanh, Sunnyvale, CA (US); Russell Blaine Jorgensen, Arvada, CO (US); Robert Eugene Wyrick, Firestone, CO (US); Justin Lee Hicks, Boulder, CO (US); Stephen Nowland Clark, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 369 days.

(21) Appl. No.: 14/229,712

(22) Filed: Mar. 28, 2014

(65) Prior Publication Data
US 2014/0297700 A1    Oct. 2, 2014

Related U.S. Application Data

(60) Provisional application No. 61/806,079, filed on Mar. 28, 2013.

(51) Int. Cl.
*G06F 17/30* (2006.01)

(52) U.S. Cl.
CPC .. *G06F 17/30194* (2013.01); *G06F 17/30106* (2013.01); *G06F 17/30997* (2013.01)

(58) Field of Classification Search
CPC .............. G06F 17/30997; G06F 17/30; G06F 17/30525; G06F 17/30722

(Continued)

(56) References Cited

U.S. PATENT DOCUMENTS

| 7,263,688 B2 | 8/2007 | Pitzel et al. |
| 7,680,932 B2 | 3/2010 | Defaix et al. |

(Continued)

FOREIGN PATENT DOCUMENTS

| KR | 10-2010-0137323 | 12/2010 |
| KR | 10-2012-0010397 | 2/2012 |

(Continued)

OTHER PUBLICATIONS

Beresford et al., "MockDroid: Trading Privacy for Application Functionality on Smartphones," HotMobile '11, Mar. 1-3, 2011, Phoenix, AZ, USA, pp. 49-54.

(Continued)

*Primary Examiner* — Monica Pyo
(74) *Attorney, Agent, or Firm* — Lowenstein Sandler LLP

(57) ABSTRACT

A cloud storage system identifies and creates metadata associated with a stored file. On receiving a request to access the file with an application, the cloud storage system generates a metadata category associated only with the application, and creates metadata associated with the generated metadata category and corresponding to the file. On receiving a request to access file metadata, the cloud storage system identifies an application associated with the metadata access request, identifies a set of metadata categories associated with the identified application, filters metadata associated with the file based on the identified set of metadata categories, and provides the filtered metadata to the application.

28 Claims, 7 Drawing Sheets

(58) Field of Classification Search
USPC .......................................... 707/722, 822, 827
See application file for complete search history.

(56) References Cited

U.S. PATENT DOCUMENTS

| | | | |
|---|---|---|---|
| 7,689,633 B1 | 3/2010 | Li et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,779,113 B1 | 8/2010 | Samar |
| 7,827,201 B1 | 11/2010 | Gordon et al. |
| 7,917,888 B2 | 3/2011 | Chong et al. |
| 7,941,419 B2 | 5/2011 | Bhatkar et al. |
| 7,996,380 B2 | 8/2011 | Arrouye et al. |
| 8,108,427 B2 | 1/2012 | Prahlad et al. |
| 8,131,723 B2 | 3/2012 | Sim-Tang |
| 8,151,323 B2 | 4/2012 | Harris et al. |
| 8,250,455 B2 | 8/2012 | Kadowaki et al. |
| 8,341,708 B1 | 12/2012 | Eatough et al. |
| 8,346,781 B1 | 1/2013 | Cornelius |
| 8,364,759 B2 | 1/2013 | Moromisato et al. |
| 8,386,478 B2 | 2/2013 | Wang |
| 8,468,455 B2 | 6/2013 | Jorgensen et al. |
| 8,478,817 B2 | 7/2013 | Duggal |
| 8,484,259 B1* | 7/2013 | Makkar ............. G06F 17/30979 |
| | | | 707/769 |
| 8,504,689 B2 | 8/2013 | Ferris et al. |
| 8,522,137 B1 | 8/2013 | Brown et al. |
| 8,572,033 B2 | 10/2013 | Shukla |
| 8,612,439 B2 | 12/2013 | Prahlad et al. |
| 8,706,800 B1 | 4/2014 | Ahmed et al. |
| 8,812,627 B2 | 8/2014 | Donahue et al. |
| 8,856,176 B1 | 10/2014 | Venu et al. |
| 8,880,580 B2 | 11/2014 | Simmons et al. |
| 9,396,194 B2* | 7/2016 | Kaszynski ......... G06F 17/30038 |
| 2003/0033369 A1 | 2/2003 | Bernhard |
| 2003/0126592 A1 | 7/2003 | Mishra et al. |
| 2004/0059776 A1 | 3/2004 | Pitzel et al. |
| 2004/0205358 A1 | 10/2004 | Erickson |
| 2004/0243827 A1* | 12/2004 | Aguilera ............. G06F 21/6218 |
| | | | 726/27 |
| 2005/0243760 A1 | 11/2005 | Yoshioka |
| 2005/0289538 A1 | 12/2005 | Black-Ziegelbein et al. |
| 2006/0005168 A1 | 1/2006 | Singh |
| 2006/0070029 A1 | 3/2006 | Laborczfalvi et al. |
| 2006/0074837 A1 | 4/2006 | Braddy et al. |
| 2006/0178778 A1 | 8/2006 | Fuhlbrigge et al. |
| 2007/0106984 A1 | 5/2007 | Birk Olsen et al. |
| 2007/0192739 A1 | 8/2007 | Hunleth et al. |
| 2007/0240098 A1 | 10/2007 | Averett et al. |
| 2007/0254631 A1 | 11/2007 | Spooner |
| 2008/0033921 A1 | 2/2008 | Arrouye et al. |
| 2008/0162493 A1 | 7/2008 | Blohm et al. |
| 2008/0172720 A1 | 7/2008 | Botz et al. |
| 2008/0184157 A1 | 7/2008 | Selig |
| 2008/0189361 A1 | 8/2008 | Greschler et al. |
| 2009/0083707 A1 | 3/2009 | Fujita et al. |
| 2009/0115901 A1 | 5/2009 | Winter et al. |
| 2009/0210721 A1 | 8/2009 | Phillips |
| 2009/0235352 A1 | 9/2009 | Schrijen et al. |
| 2009/0249185 A1 | 10/2009 | Datar et al. |
| 2009/0254572 A1 | 10/2009 | Redlich et al. |
| 2009/0254580 A1 | 10/2009 | Laurion |
| 2009/0288135 A1 | 11/2009 | Chang et al. |
| 2010/0005529 A1 | 1/2010 | Hemade |
| 2010/0083173 A1 | 4/2010 | Germann et al. |
| 2010/0088234 A1 | 4/2010 | Moore et al. |
| 2010/0161762 A1 | 6/2010 | Saxena |
| 2010/0257578 A1 | 10/2010 | Shukla et al. |
| 2010/0274910 A1 | 10/2010 | Ghanaie-Sichanie et al. |
| 2010/0281528 A1 | 11/2010 | Hayton et al. |
| 2010/0287219 A1 | 11/2010 | Caso et al. |
| 2010/0325086 A1 | 12/2010 | Skinner et al. |
| 2010/0325199 A1* | 12/2010 | Park ............... G06F 17/30067 |
| | | | 709/203 |
| 2011/0063410 A1 | 3/2011 | Robert |
| 2011/0066668 A1 | 3/2011 | Guarraci |
| 2011/0093507 A1 | 4/2011 | Pilip |
| 2011/0137979 A1 | 6/2011 | Seo et al. |
| 2011/0154290 A1 | 6/2011 | Kelly |
| 2011/0184993 A1 | 7/2011 | Chawla et al. |
| 2011/0202672 A1 | 8/2011 | Narayanaswamy et al. |
| 2011/0209045 A1* | 8/2011 | Ghosh ................ G06Q 10/10 |
| | | | 715/234 |
| 2011/0231912 A1 | 9/2011 | Lee et al. |
| 2011/0247074 A1 | 10/2011 | Manring |
| 2011/0252038 A1 | 10/2011 | Schmidt et al. |
| 2011/0252071 A1* | 10/2011 | Cidon .............. G06F 17/30174 |
| | | | 707/802 |
| 2011/0258535 A1 | 10/2011 | Adler, III et al. |
| 2012/0005159 A1 | 1/2012 | Wang et al. |
| 2012/0072465 A1 | 3/2012 | McGowan et al. |
| 2012/0084685 A1 | 4/2012 | Heynen et al. |
| 2012/0095878 A1 | 4/2012 | Feldman et al. |
| 2012/0099135 A1 | 4/2012 | Ono |
| 2012/0110646 A1 | 5/2012 | Ajitomi et al. |
| 2012/0117626 A1 | 5/2012 | Yates et al. |
| 2012/0136865 A1 | 5/2012 | Blom et al. |
| 2012/0144202 A1 | 6/2012 | Counterman |
| 2012/0144454 A1 | 6/2012 | Lee |
| 2012/0158668 A1 | 6/2012 | Tu et al. |
| 2012/0173612 A1 | 7/2012 | Vegesna-Venkata et al. |
| 2012/0179746 A1 | 7/2012 | Bolgert et al. |
| 2012/0192067 A1 | 7/2012 | DeLuca et al. |
| 2012/0254042 A1 | 10/2012 | Ludemann |
| 2012/0266229 A1 | 10/2012 | Simone et al. |
| 2013/0018904 A1 | 1/2013 | Mankala et al. |
| 2013/0036455 A1 | 2/2013 | Bodi et al. |
| 2013/0054356 A1 | 2/2013 | Richman et al. |
| 2013/0086670 A1 | 4/2013 | Vangpat et al. |
| 2013/0111336 A1 | 5/2013 | Dorman et al. |
| 2013/0124606 A1 | 5/2013 | Carpenter et al. |
| 2013/0144934 A1 | 6/2013 | Swett et al. |
| 2013/0150163 A1 | 6/2013 | Radek et al. |
| 2013/0282752 A1 | 10/2013 | Day-Richter et al. |
| 2013/0282755 A1 | 10/2013 | Procopio et al. |
| 2013/0304797 A1 | 11/2013 | Warren et al. |
| 2014/0074712 A1 | 3/2014 | Palmer et al. |

FOREIGN PATENT DOCUMENTS

| | | |
|---|---|---|
| KR | 10-2012-0065072 | 6/2012 |
| KR | 10-2013-0007459 | 1/2013 |
| WO | WO-01/35211 | 5/2001 |
| WO | WO-2010/054374 | 5/2010 |

OTHER PUBLICATIONS

Bibi et al., "A Platform for Delivering Multimedia Presentations on Cultural Heritage," 2010 14th Panhellenic Conference on Informatics, pp. 175-179.
Ellis et al., "Concurrency Control in Groupware Systems," ACM 1989, pp. 399-407.
Guo et al., "Building the PolarGrid Portal Using Web 2.0 and OpenSocial," SC '09, Nov. 14-20, 2009, Portland, Oregon, USA; 8 pages.
http://web.archive.org/web/20110629120453/https://developer.mozilla.org/en/Setting_up_extension_development_environment, Jun. 29, 2011, printed Jan. 9, 2015, 5 pages.
http://web.archive.org/web/20111006093926/https://addons.mozilla.org/en-US/firefox/extensions/?sort=featured, Oct. 6, 2011, printed Oct. 26, 2014, 9 pages.
http://web.archive.org/web/20111219132014/https://addons.mozilla.org/en-US/seamon key, Dec. 19, 2011, printed Oct. 26, 2014, 5 pages.
http://web.archive.org/web/20120512130530/https://developermozilla.org/en/Setting_up_extension_development_environment, May 12, 2012, 7 pages.
http://web.archive.org/web/20120819143535/https://addons.mozilla.org/en-US/firefox/extensions/?sort=featured, Aug. 19, 2012, printed Dec. 13, 2013, 3 pages.

(56) References Cited

OTHER PUBLICATIONS http://web.archive.org/web/20121020134710/https://addons.mozilla.org/en-US/seamonkey/extensions, Oct. 20, 2012, printed Dec. 13, 2013, 3 pages.
http://web.archive.org/web/20121021135356/http://support.mozilla.org/en-US/kb/find-and-install-add-ons-add-features-to-firefox, Oct. 21, 2012, printed Dec. 13, 2013, 3 pages.
http://web.archive.org/web20111226173518/http://en.wikipedia.org/wiki/Add-on_(Mozilla), Dec. 26, 2011, printed Oct. 26, 2014, 5 pages.
http://www-archive.mozilla.org/projects/webservices/, snapshot taken Apr. 21, 2008, printed Dec. 13, 2013, 4 pages.
https://addons.mozilla.org/en-US/firefox/addon/extension-manager-extended/, printed Oct. 26, 2014, 2 pages.
https://addons.mozilla.org/En-us/seamonkey/addon/gmail-smime/?src=search, printed Dec. 13, 2013, 2 pages.
International Search Report and Written Opinion for PCT/US2014/029756 dated Jul. 28, 2014, 11 pages.
International Search Report and Written Opinion for PCT/US2013/047877 dated Oct. 31, 2013, 9 pages.
International Search Report and Written Opinion for PCT/US2013/037701 dated Jun. 26, 2013, 10 pages.
International Search Report and Written Opinion for PCT/US2013/037773 dated Aug. 21, 2013, 13 pages.
Mayer et al., "Third-Party Web Tracking: Policy and Technology," Proceedings of the 2012 IEEE Symposium on Security and Privacy, pp. 413-427, May 20-23, 2012.
Nauman et al., "Apex: Extending Android Permission Model and Enforcement with User-Defined Runtime Constraints," ASIACCS '10, Apr. 13-16, 2010, Beijing, China, pp. 328-332.
Nichols et al., "High-Latency, Low-Bandwidth Windowing in the Jupiter Collaboration System," UIST '95. 8th Annual Symposium on User Interface Software and Technology. Proceedings of the ACM Symposium on User Interface Software and Technology, Nov. 14-17, 1995, pp. 111-120.
The Oauth 2.0 Authorization Protocol; draft ietf-oauth-v2-24; Mar. 8, 2012, 44 pages.
Zhou et al., "Taming Information-Stealing Smartphone Applications (on Android)," TRUST 2011, LNCS 6740, pp. 93-107, 2011.
Zissis et al., "Addressing Cloud Computing Security Issues," Future Generation Computer Systems 28 (2012) 583-592.
PCT/US2014/032167 International Search Report mailed Jul. 30, 2014.

* cited by examiner

FILE DATABASE 300

| | 304 CONTENT | 306 PUBLIC: GENERAL: NAME | 308 PUBLIC: GENERAL: TYPE | 310 PRIVATE: APPLICATION-SPECIFIC: NEXTAPPROVAL |
|---|---|---|---|---|
| FILE 302A | ######## | LOREM | TEXT | KATE |
| FILE 302B | ######## | IPSUM | IMAGE | KATE |
| FILE 302C | ######## | DOLOR | AUDIO | PAT |

Fig. 3

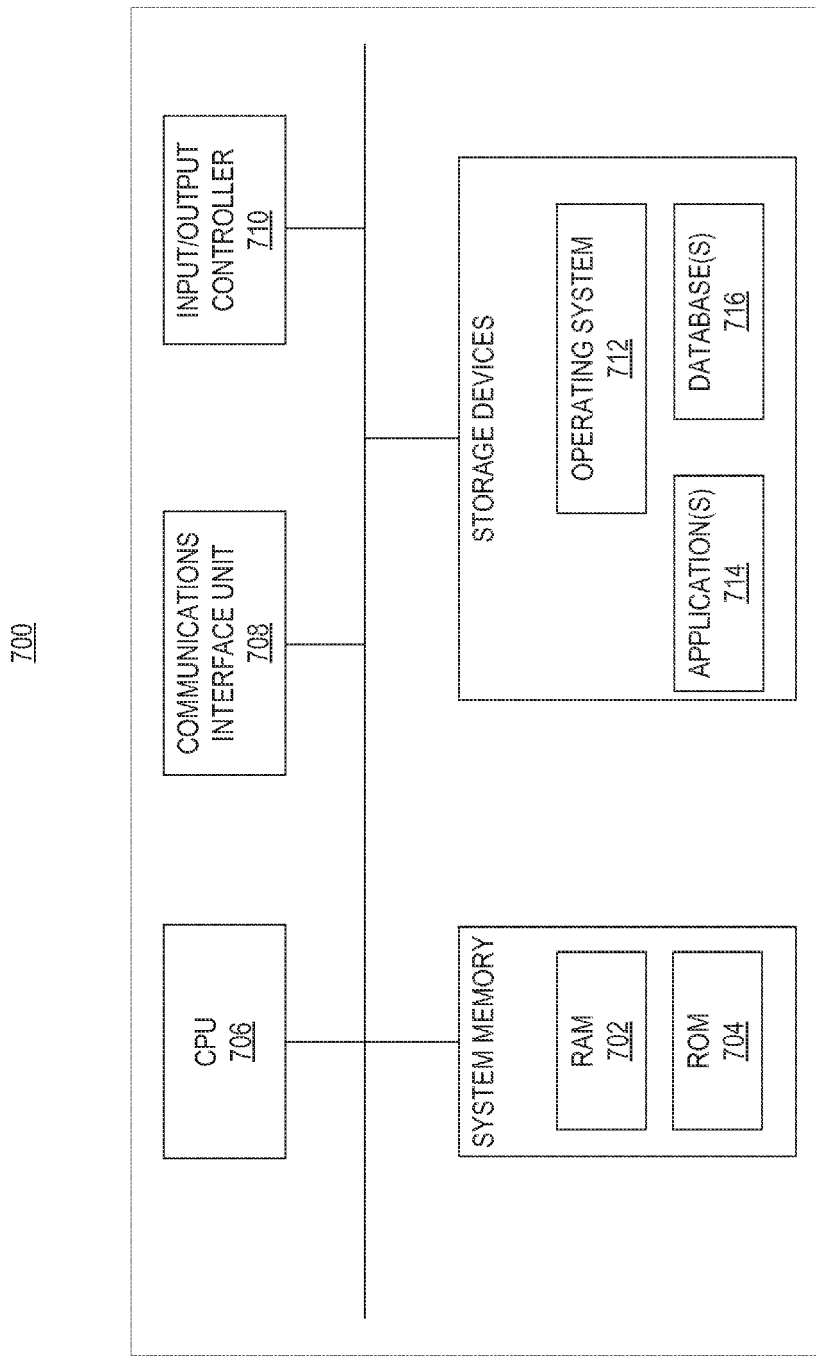

SYSTEM AND METHOD TO STORE THIRD-PARTY METADATA IN A CLOUD STORAGE SYSTEM

CROSS-REFERENCE TO RELATED APPLICATIONS

This application claims priority to U.S. Provisional Application Ser. No. 61/806,079, filed on Mar. 28, 2013, entitled "System and Method to Store Third-Party Metadata in a Cloud Storage System," the entire contents of which are hereby incorporated by reference.

BACKGROUND

Personal computers traditionally store files locally on a medium directly accessed by the computer generating or editing the files. As network access has become more widespread, it has become feasible to store files on a remote network. Storing files on a remote network, also referred to as cloud storage, allows a user to access the files using any device that can access the network. Such cloud storage systems reduce the user's need for local storage capacity and assure the user that, regardless of which device is accessing a file, an up-to-date copy of the file is being accessed.

Existing cloud storage systems limit the metadata associated with the files they store. Such systems may record information corresponding to different metadata categories, such as a name of the file, a creation date of the file, the last time the contents of the file were modified, or other suitable information that is typically limited to a set of predetermined categories of metadata. Applications interacting with the files stored in existing cloud storage systems are therefore restricted to either using the predetermined metadata categories or relying on a second storage system to keep track of metadata that the cloud storage system does not store.

SUMMARY

Thus there exists a need in the art to allow applications to generate and interact with alternative metadata categories. The systems and methods described herein allow a cloud storage system to store third-party-generated metadata that is associated with a file but may not be associated with a predefined metadata category. The systems and methods described herein further allow a cloud storage system to identify files to third-party applications based on one or more metadata elements.

In certain aspects, the systems and methods described herein relate to providing metadata associated with a file stored on a cloud storage system to an application. Metadata may include a text string, a numerical value, a date or time, or other suitable information, and in some implementations some metadata may change as a predetermined function of time. The cloud storage system may include a communication processor that receives a request to access metadata associated with the file. The communication processor identifies a first application associated with the request, and identifies a first set of metadata categories associated with the first application. The communication processor filters metadata associated with the file based on the first set of metadata categories, and provides the filtered metadata to the application. In some implementations, the communication processor also identifies whether a user is associated with a metadata category and which user is associated with the request, and such information may also be used to filter metadata associated with the file. In some implementations, the communication processor also generates both metadata categories in the first set of metadata categories and metadata in such categories. In some such implementations, the communication processor also deletes such metadata categories when a user revokes permission of their associated application to access the file.

In certain aspects, the systems and methods described herein relate to creating metadata associated with a file stored on a cloud storage system. The cloud storage system may include a communication processor that receives a request to access the file with an application. The communication processor identifies the application and generates a metadata category associated only with the identified application. The communication processor creates metadata associated with the generated metadata category and corresponding to the file. In some implementations, the communication processor deletes the metadata category in response to a user revoking permission of the application to access the file.

BRIEF DESCRIPTION OF THE DRAWINGS

The systems and methods described herein are set forth in the appended claims. However, for the purpose of explanation, several embodiments are set forth in the following drawings.

FIG. 3 is a table depicting an exemplary file database storing the contents of and metadata associated with files, according to an illustrative implementation;

FIG. 7 is a block diagram of a computing device for performing any of the processes described herein, according to an illustrative implementation.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to accessing and editing metadata associated with a file stored on a cloud storage system. The cloud storage system may allow applications to create application-specific metadata for a file, and may further identify files based on general or application-specific metadata. The cloud storage system may restrict which users or which applications may access or alter metadata associated with certain metadata categories.

Figure 1:
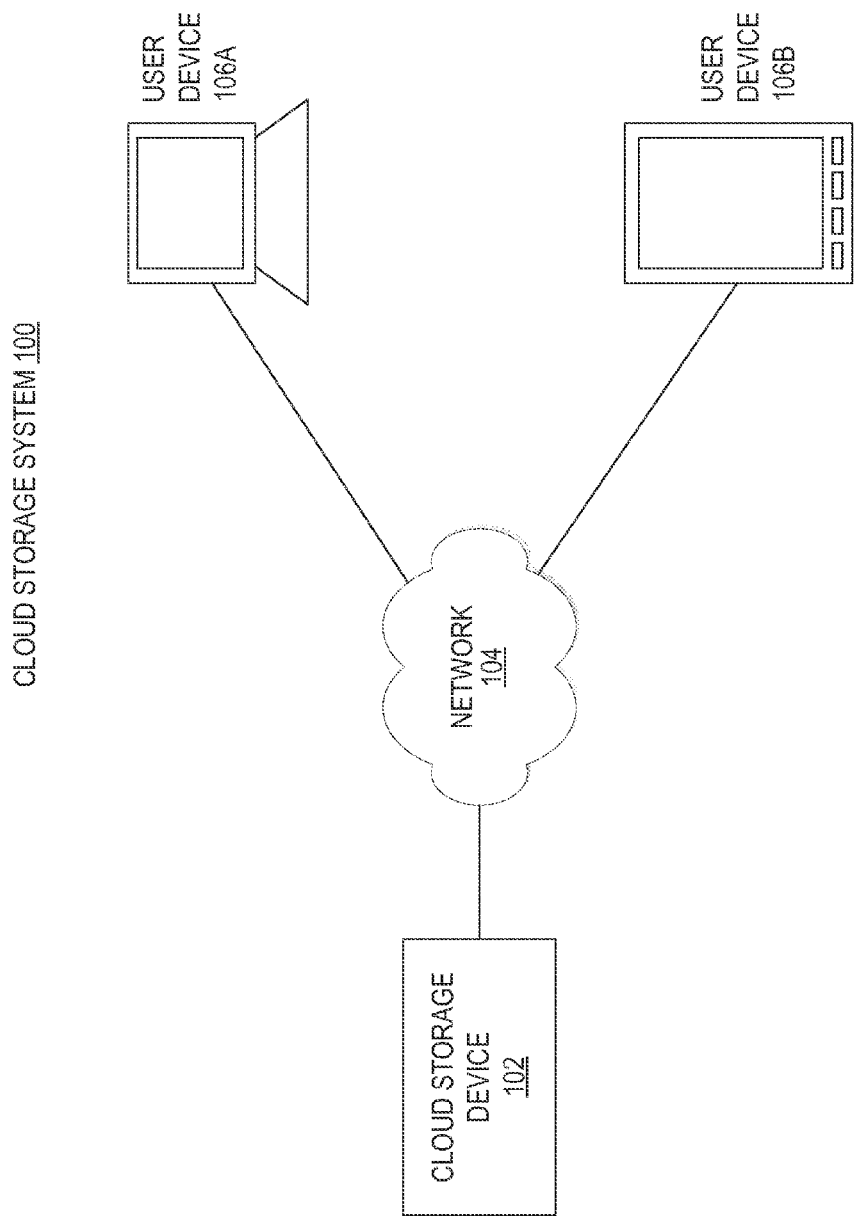
FIG. 1 is a block diagram of a cloud storage system, according to an illustrative implementation.

FIG. 1 is an illustrative block diagram of a cloud storage system 100, which provides remote storage of and access to computer files. Computer files may include text, pictures, audio files, video files, presentation files, spreadsheets, binary data files, computer instructions, HyperText Markup Language (HTML) files, or other suitable files. Files are stored on cloud storage device 102, which may include a server, a personal computer, a mainframe, a cluster of computing devices, or some other suitable computing device, and which is described in more detail in relation to FIG. 2. Files may be uploaded to or accessed from cloud storage device 102 via network 104. Network 104 is a computer network, and in certain implementations may be the Internet. As depicted, user devices 106A and 106B (collectively user devices 106) may interact with cloud storage device 102 through network 104.

A user device 106 is a computing device that may be used to access cloud storage device 102, and may be a personal laptop computer, a personal desktop computer, a tablet computer, a smartphone, or some other suitable computing device. User device 106 may include installed applications, or may have access to applications that are capable of accessing or altering files stored on cloud storage device 102. In certain implementations, user device 106 may store information regarding one or more users, the data processing capacity of user device 106, a list of installed applications, a list of file types accessible by each installed application, the categories of metadata used by each installed application, or other suitable information regarding the capability of user device 106 to access files stored on cloud storage device 102. In such implementations, user device 106 may be configured to transmit a portion or the whole of such information upon first connecting to cloud storage device 102, in response to a query by cloud storage device 102, or under other suitable circumstances.

Cloud storage system 100 stores computer files and allows a user to access the files with a remote user device 106. A user device 106 connects to cloud storage device 102 through network 104. An application on user device 106 may generate, access, edit, or delete metadata associated with a file stored on cloud storage device 102.

Figure 2:
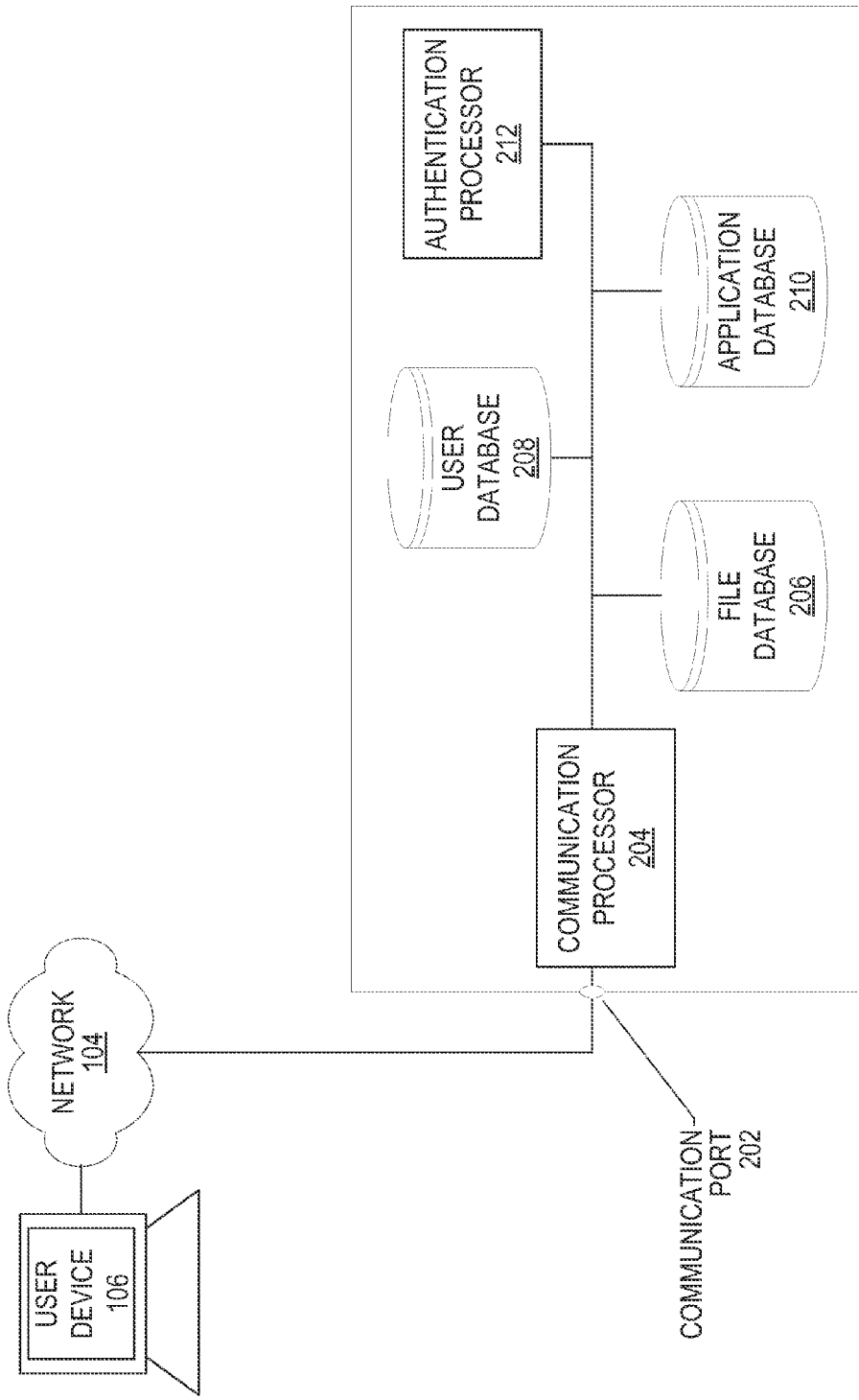
FIG. 2 is a block diagram of a cloud storage engine, according to an illustrative implementation.

FIG. 2 is an illustrative block diagram of a cloud storage engine 200, which may act as the cloud storage device 102 of FIG. 1. Cloud storage engine 200 allows user device 106 to access files over network 104. Cloud storage engine 200 transmits and receives data through communication port 202. Communication processor 204 identifies user instructions received through communication port 202 and stores or transmits information based on the received instructions. The content and metadata of files may be stored in file database 206, user information may be stored in user database 208, and information regarding applications may be stored in application database 210. Authentication processor 212 may verify that a request to access or edit information associated with cloud storage engine 200 is authorized.

The depicted communication port 202 is a network port which receives user commands via network 104 and transmits information sent by cloud storage engine 200. Communication port 202 may include a 100BASE-TX port, a 1000BASE-T port, a 10GBASE-T port, a Wi-Fi antenna, a cellular antenna, or other suitable network ports. In certain implementations, there may be a different number of ports than are depicted. In certain implementations, communication port 202 may provide secure communications, such as by using the Secure Sockets Layer (SSL) protocol, the Transport Layer Security (TLS) protocol, or other suitable protocol.

Communication processor 204 may be a computer processor which identifies instructions received through communication port 202 and may store or transmit information in response. Upon a user connecting to cloud storage engine 200, communication processor 204 may identify the user, in certain implementations by comparing login information provided by the user to information stored in user database 208. Communication processor 204 may further identify the user device 106 or an application thereon from packet headers identifying the source of data received from the user, by querying the user device 106, from information provided by the user device 106 at login, or through some other suitable method of identifying the user device or an application thereon. Communication processor 204 may respond to a user command by identifying files having metadata that meets criteria provided in the user command, by transmitting metadata associated with one or more files to a user, by editing metadata associated with a file, or by some other suitable measure according to the command. Communication processor 204 may also provide access to or edit content of a file according to a user command, which in some implementations may also cause communication processor 204 to edit metadata associated with the file. As an illustrative example of such implementations, upon implementing a user edit to the content of a file, communication processor 204 may also adjust metadata indicating the last time the file was edited.

File database 206 may be a computer-readable and -writable medium storing at least one file associated with a cloud storage system 100. In some implementations, a portion of file database 206 may be accessed through a remote network. Such a portion may be a third-party database. Files stored on file database 206 may include text, images, audio files, video files, spreadsheets, presentation files, HTML files, or other suitable computer files. File database 206 may also store metadata associated with each file. Each item of metadata may correspond to a metadata category, such as a Multipurpose Internet Mail Extensions (MIME) type of the file, the time at which the file was generated, or other suitable metadata category. A metadata category may be associated with every file in file database 206 or with only a portion of the files in file database 206. As an illustrative example, each file in file database 206 may have a file identifier, while only files associated with a particular application may be associated with a metadata category unique to the application. In certain implementations, metadata may be stored in a database separate from file database 206.

Each category of metadata may be general or application-specific. General metadata may be accessible to any application associated with the file, and in some implementations any application associated with the file may edit general metadata. Application-specific metadata may be accessible to and edited by a single application. In some implementations, application-specific metadata may be accessible to a set of applications. In some such implementations, a subset of the applications may edit the application-specific metadata. File database 206 may store information indicating whether a category of metadata is general or application-specific, and with which application or set of applications an application-specific category of metadata is associated. In some implementations, any application may generate general metadata categories. In some implementations, information about whether metadata is general or application-specific may be stored in application database 210.

Each category of metadata may also be public or private. Public metadata may be accessed by any user with permission to access the file, while private metadata may only be accessed by an owner of the metadata or a user that the owner authorized to access the private metadata. As an illustrative example, a filename may be public metadata, while metadata indicating the stage of a document within a workflow may be private metadata. File database 206 may store information indicating whether a category of metadata is public or private, and which user or set of users may access or edit public or private metadata. In some implementations, information about whether metadata is public or private may be stored in user database 208.

In some implementations, a metadata category may be associated with another metadata category. As an illustrative example of such implementations, a first metadata category may indicate a document priority, while a second metadata category may indicate a deadline after which the document priority will change.

User database 208 may be a computer-readable and -writable medium storing information associated with at least one user of cloud storage engine 200. The information may include one or more of a username and password associated with a user, a list of the files associated with each user, a list of at least one user device 106 associated with the user, a list of applications available to a user, a list of each application the user has authorized to access each file or file type represented in the user's files, user-specified preferences, or other suitable user information.

Application database 210 may be a computer-readable and -writable medium storing information regarding applications associated with cloud storage engine 200. Application database 210 may store metadata associated with an application, which may include metadata categories visible to the application, metadata categories that may be edited by the application, file types the application is capable of opening, the users authorized to use the application, or other suitable information. In some implementations, application database 210 may include compiled or uncompiled computer instructions comprising an application, a link to access a cloud application, a link to download a native application, an icon associated with the application, a description of the application, or other suitable information regarding an application. In some implementations, some applications may be stored as computer instructions that may be performed by a web browser run on a user device 106, which may be written in HTML, JavaScript, Asynchronous JavaScript and XML (Ajax), or another suitable computer language. In some such implementations, a stored application may be executed by cloud storage engine 200 and one or more outputs from the application may be transmitted to a user device 106.

Authentication processor 212 may be a computer processor that blocks unauthorized access or editing of information associated with cloud storage engine 200. Unauthorized access may be detected by comparing one or more of a username and password combination, information identifying a user device 106, geographic information associated with the user device 106, or other suitable information with information stored in user database 208. If a request to access or edit information is not successfully verified, authentication processor 212 may transmit a message to the user or a system administrator, block user device 106, temporarily lock the user account, or take some other predetermined action. In certain implementations, if a user device 106 has not previously been connected to cloud storage engine 200, authentication processor 212 may require the user to provide identification information, which may include a username and password combination, an identification number provided to the user by a voice or text message sent to a telephone number previously provided by the user, or other predetermined identification information. In certain implementations, authentication processor 212 may verify that an application may be allowed to access or edit contents or metadata of a file by searching file database 206, user database 208, and application database 210 to determine whether the application is associated with the user who generated the request, whether the user is permitted to access or alter the file, whether the application is associated with the category of metadata being accessed or edited, whether the user has authorized the application to access the file or the file type, or other suitable verification information. In some such implementations, authentication processor 212 may verify a security token provided by the application against information stored in one or more of file database 206, user database 208, or application database 210. If an application is not authorized to access information, authentication processor 212 may prevent the application from accessing the information, transmit a message to the user or a system administrator, or take some other suitable action. In certain implementations, such a message to the user may ask if the user wishes to authorize the application to access the information. In certain implementations, authentication processor 212 may establish a secure connection with user device 106 using a protocol such as the SSL or TLS protocols.

Cloud storage engine 200 receives transmissions from user device 106 at communication port 202 via network 104. Communication processor 204 may identify an account associated with a user upon the establishment of a connection with a user device 106, and authentication processor 212 may compare information provided by user device 106 with information stored in user database 208 to verify that the user has access to the account. Communication processor 204 may identify files based on metadata associated with the file. Authentication processor 212 may verify that requests to access or edit one or more metadata categories associated with a file were generated by a user and an application authorized to access or edit the metadata categories, and, if the request is successfully verified, communication processor 204 may implement the request.

FIG. 3 is an illustrative table depicting a file database 300, such as the file database 206 described in relation to FIG. 2. As depicted, file database 300 stores files 302A, 302B, and 302C, collectively files 302. For each file 302, file database 300 records the content 304 of the file as well as three categories of metadata describing each file. Metadata category 306 is a public, general category, and indicates the name of the file 302. Metadata category 308 is a public, general category, and indicates the type of the file 302. Metadata category 310 is a private, application-specific category, and indicates which user is next in line to approve the associated file 302. Thus, an authorized search for files with "Kate" as their metadata in metadata category 310 would return files 302A and 302B, while a similar search for image files named "Lorem" would return no files. The metadata categories here depicted may vary in number, whether they are public or private, whether they are general or application-specific, and in the information they record. Likewise, the number, content, and associated metadata of files 302 may vary from how they are here depicted. As an illustrative example, file 302A may be associated with application-specific metadata associated with metadata category 310, while file 302B may not be associated with any application-specific metadata at all. In some implementations, metadata in a metadata category may vary with time. As an illustrative example of such implementations, a metadata category may indicate the priority of a document, which may increase with time.

Figure 4:
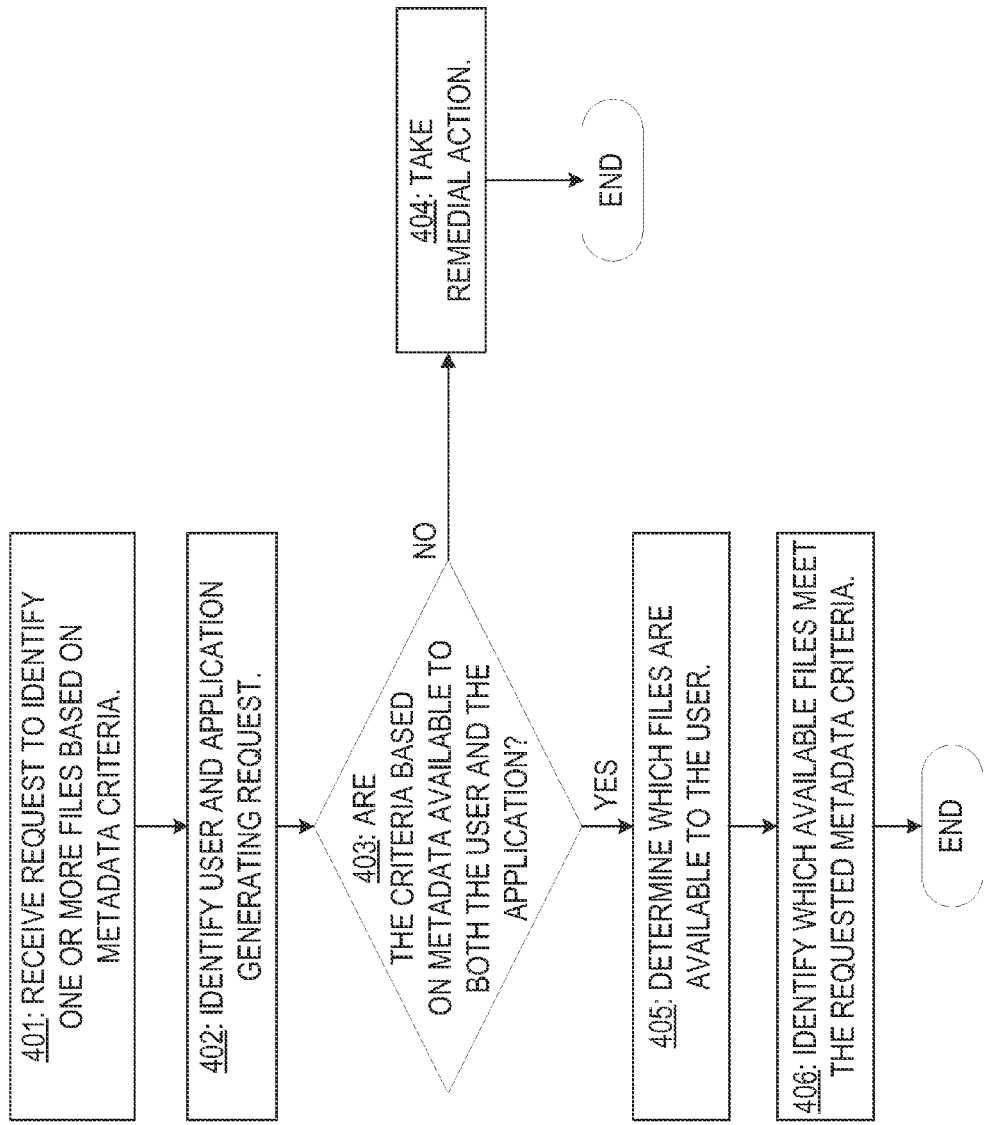
FIG. 4 is a flow chart of a process for searching for files on a cloud storage system based on metadata associated with the files, according to an illustrative implementation.

FIG. 4 is an illustrative flow chart of a metadata search process 400. Metadata search process 400 identifies one or more files matching criteria provided by a user or an application. Referring also to FIG. 2, metadata search process 400 begins with step 401, in which communication processor 204 receives a request to identify one or more files based on metadata criteria. The request may be generated by a user through an application run on or provided to user device 106, and the application may be an operating system, a web browser, a document editing application, or some other suitable application. Metadata criteria may include one or more of a text string associated with a metadata category, a range of numerical values associated with a metadata category, a range of dates and times associated with a metadata category, the absence of a text string associated with a metadata category, or other suitable criteria.

In step 402, communication processor 204 identifies the user and the application associated with the request based on the source of the request, a token associated with the request, or some other suitable indicator. In step 403, authentication processor 212 verifies that both the user and the application generating the request are authorized to access the metadata categories associated with the request made in step 401. If the request is made by an unauthorized user or application, metadata search process 400 ends with communication processor 204 taking remedial action in step 404. The remedial action may include indicating that there are no files meeting the criteria of step 401, blocking the application from accessing cloud storage engine 200, alerting the user or a system administrator, transmitting a message to the user informing them how they may gain access to the file, or some other appropriate action. If authentication processor 212 instead verifies that the user and the application are authorized to access the varieties of metadata indicated in the search of step 401, metadata search process 400 continues to step 405.

In step 405, communication processor 204 determines which files are available to the user identified in step 402. The determination may be based on user-related metadata stored in file database 206 or in a listing of files associated with a user stored in user database 208. In step 406, communication processor 204 then identifies which of the available files meet the requested metadata criteria. This information may be provided to a user or to an application as a list of filenames or other file identifiers. In some implementations, the list may also provide information such as the metadata associated with the criteria of step 401.

Figure 5:
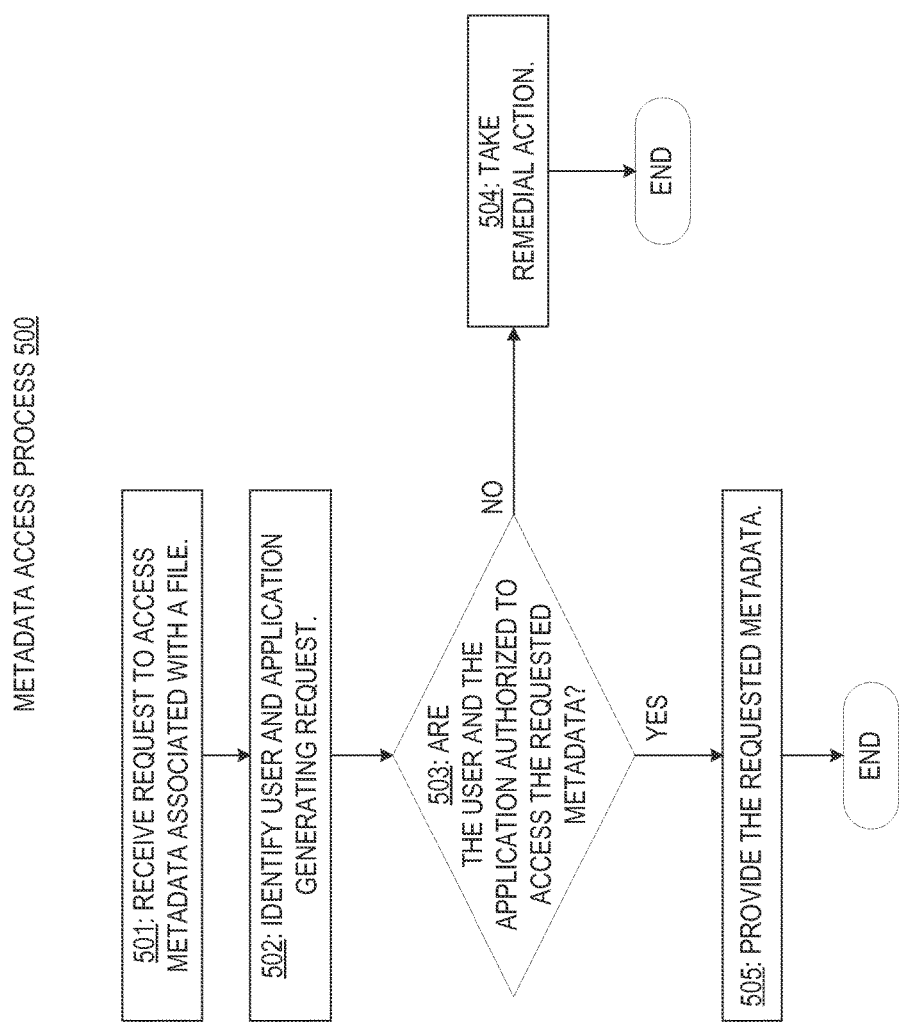
FIG. 5 is a flow chart of a process for providing access to metadata associated with a file on a cloud storage system, according to an illustrative implementation.

FIG. 5 is an illustrative flow chart of a metadata access process 500. Metadata access process 500 provides metadata associated with one or more files. Referring also to FIG. 2, metadata access process 500 begins with step 501, in which communication processor 204 receives a request for access to metadata associated with a file. The request may be generated by a user through an application run on or provided to user device 106, and the application may be an operating system, a web browser, a document editing application, or some other suitable application.

In step 502, communication processor 204 identifies the user and the application associated with the request based on the source of the request, a token associated with the request, or some other suitable indicator. In step 503, authentication processor 212 verifies that both the user and the application generating the request are authorized to access the metadata requested in step 501. If the request is made by an unauthorized user or application, metadata search process 500 ends with communication processor 204 taking remedial action in step 504. The remedial action may include indicating that the requested metadata is not available, blocking the application from accessing cloud storage engine 200, alerting the user or a system administrator, transmitting a message to the user informing them how they may gain access to the metadata, or some other appropriate action. If authentication processor 212 instead verifies that the user and the application are authorized to access the metadata requested in step 501, metadata search process 500 ends with step 505, in which communication processor 204 retrieves the requested metadata from file database 206 and provides it to the user through the application used to generate the request.

Figure 6:
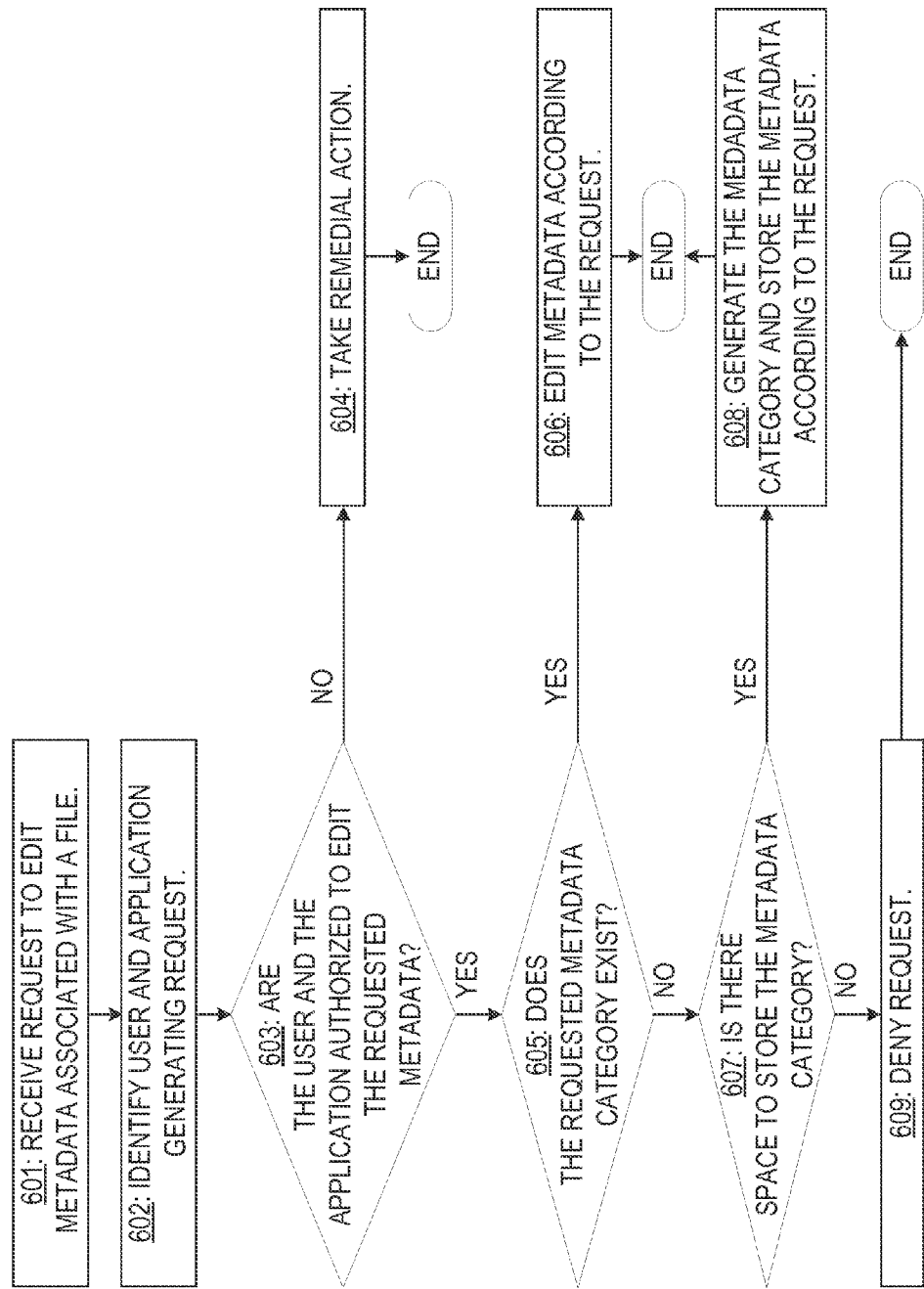
FIG. 6 is a flow chart of a process for editing metadata associated with a file stored on a cloud storage system, according to an illustrative implementation.

FIG. 6 is an illustrative flow chart of a metadata edit process 600. Metadata edit process 600 edits metadata associated with a file. Referring also to FIG. 2, metadata edit process 600 begins with step 601, in which communication processor 204 receives a request to edit metadata associated with a file. The request may be generated by a user through an application run on or provided to user device 106, and the application may be an operating system, a web browser, a document editing application, or some other suitable application.

In step 602, communication processor 204 identifies the user and the application associated with the request based on the source of the request, a token associated with the request, or some other suitable indicator. In step 603, authentication processor 212 verifies that both the user and the application generating the request are authorized to make the edit requested in step 601. If the request is made by an unauthorized user or application, metadata edit process 600 may end with communication processor 204 taking remedial action in step 604. The remedial action may include blocking the application from accessing cloud storage engine 200, alerting the user or a system administrator, transmitting a message to the user informing them how they may gain access to the file, or some other appropriate action. If authentication processor 212 instead verifies that the user and the application are authorized to make the edit requested in step 601, metadata edit process 600 continues to step 605.

In step 605, communication processor 204 determines whether the file is associated with the metadata category associated with the request of step 601. If so, metadata edit process 600 ends with step 606, in which communication processor 204 edits the metadata according to the request of step 601. If not, metadata process 600 continues to step 607, in which communication processor 204 determines whether the metadata quota associated with the file has been reached. A metadata quota may restrict the number of metadata categories associated with a file, the number of an application's application-specific metadata categories associated with a file, or otherwise restrict the metadata that may be associated with a file. As an illustrative example of a metadata quota, a file may be restricted to having one hundred metadata categories, with a maximum of thirty application-specific metadata categories associated with any one application. If there is space to store the metadata category, metadata edit process 600 ends with step 608, in which communication processor 204 generates the metadata category for the file and stores the requested metadata therein. Thus, the metadata stored in cloud storage engine 200 is not limited to a hardcoded set of metadata categories, but may accept arbitrary metadata categories generated by applications accessing cloud storage engine 200. In some implementations, there may be no quota, in which case step 607 would always be followed by step 608. Otherwise, if storing the metadata would cause the metadata quota to be exceeded, metadata edit process ends with step 609, in which the request is denied. In step 609, communication processor 204 may transmit an error code to user device 106, generate a message indicating what metadata may be deleted to allow the request to be fulfilled, or generate some other suitable message to user device 106.

In some implementations, a metadata quota may also or alternatively limit the size of metadata associated with a file, such as the amount of memory available for a metadata category, the amount of memory available for all metadata associated with a file, or some other suitable limit. In such implementations, step 605 or step 607 may be followed by step 609 if the requested edit would cause the metadata quota to be exceeded.

FIG. 7 is a block diagram of a computing device that can be used to implement or support any of the components of the system of FIG. 1 or 2, and for performing any of the processes described herein. Cloud storage engine 200 may be implemented on one or more computing devices 700 having suitable circuitry, and user device 106 may communicate with cloud storage device 102 through one or more computing devices 700 having suitable circuitry. In certain aspects, a plurality of the components of cloud storage system 100 may be included within one computing device 700. In certain implementations, a component and a storage device may be implemented across several computing devices 700.

The computing device 700 comprises at least one communications interface unit, an input/output controller 710, system memory, and one or more data storage devices. This can support a network connection such as a connection to network 104 in FIG. 1. The system memory includes at least one random access memory (RAM 702) and at least one read-only memory (ROM 704). RAM 702 can support the file database 206 of FIG. 2, for example. All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 may be linked, via network or local network, to other servers or systems.

The computing device 700 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 708 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers, or client terminals.

The CPU 706 is also in communication with the data storage device. The data storage device may comprise an appropriate combination of magnetic, optical, or semiconductor memory, and may include, for example, RAM 702, ROM 704, flash drive, an optical disc such as a compact disc, or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program. The depicted database 716 can be any suitable database system, and can be a local or distributed database system.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702, or from a computer data signal embodied in a carrier wave, such as that found within the well-known Web pages transferred among devices connected to the Internet. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a cloud storage system as described herein. The program also may include program elements such as an operating system 712, a database management system, and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, users may have metadata quotas rather than individual files, uninstalling an application or revoking its access to a file may delete application-specific metadata associated with the application, or changing metadata associated with a folder of the computer system may change corresponding metadata of the files contained within the folder. It should be understood that various alternatives to the embodiments of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

We claim:

1. A computer-implemented method of providing metadata associated with a file stored on a cloud storage system to a first application, comprising:
    receiving a request, from a user, to edit metadata associated with the file;
    identifying the first application, wherein the first application generates the request;
    dividing the metadata associated with the file into a first set of metadata categories and a second set of metadata categories, wherein the first set of metadata categories is associated with the first application and the second set of metadata categories is not associated with the first application;
    filtering the first set of metadata categories to obtain filtered metadata containing metadata associated with the file;
    providing the filtered metadata to the first application;
    receiving edits from the user, via the first application, to metadata associated with the first file;
    determining the category of metadata of the received edits and:
    in response to determining that the received edits belong to the first set of metadata categories, applying the edits to the metadata category; and
    in response to determining that the category of the metadata does not exist, generating a new metadata category associated only with the application in the first set of metadata categories.

2. The method of claim 1, further comprising:
    generating the first set of metadata categories and a second set of metadata categories, wherein the first set of metadata categories is associated with the first application and the second set of metadata categories is not associated with the first application.

3. The method of claim 1, wherein at least one metadata category in the first set of metadata categories is only associated with the first application.

4. The method of claim 1, wherein at least one metadata category in the first set of metadata categories is associated with a second application.

5. The method of claim 1, wherein at least one metadata category in the first set of metadata categories is associated with a first user.

6. The method of claim 5, further comprising:
    identifying a second user associated with the request;
    determining whether the second user is associated with the file; and
    in response to determining that the second user is associated with the file, providing the filtered metadata to the first application.

7. The method of claim 1, wherein metadata associated with at least one metadata category in the first set of metadata categories is a predetermined function of time.

8. The method of claim 1, wherein metadata includes a text string.

9. The method of claim 1, wherein metadata includes a numerical value.

10. The method of claim 1, wherein metadata includes a date and time.

11. The method of claim 1, wherein a first metadata category in the first set of metadata categories is associated with a second metadata category in the first set of metadata categories.

12. The method of claim 1, further comprising verifying that the first application is authorized to access the file.

13. A cloud storage system, comprising:
    a communication circuitry in communication with:
        a file database circuitry for storing a plurality of files and metadata associated with each of the plurality of files; and
        a user database circuitry for storing information associating at least one user with at least one file, wherein the communication circuitry is configured to:
receive a request, from a user, to edit metadata associated with a file in the plurality of files;
identify a first application generates the request;
divide the metadata associated with the file into a first set of metadata categories and a second set of metadata categories, wherein the first set of metadata categories is associated with the first application and the second set of metadata categories is not associated with the first application;
filter the first set of metadata categories to obtain filtered metadata containing metadata associated with the file;
provide the filtered metadata to the first application;
receive edits from the user to metadata associated with the first file, wherein the edited metadata is in a metadata category in the first set of metadata categories; and
determine the category of metadata of the received edits and:
in response to determining that the received edits belong to the first set of metadata categories, apply the edits to the metadata category, wherein the received edits belong to the first set of metadata categories; and
in response to determining that the category of the metadata does not exist, generate a new metadata category associated only with the application in the first set of metadata categories.

14. The system of claim 13, wherein the communication processor is further configured to generate a metadata category in the first set of metadata categories.

15. The system of claim 14, wherein the communication processor is further configured to delete the metadata category in response to a user revoking permission of the first application to access the file.

16. The system of claim 14, wherein the communication processor is further configured to generate a second set of metadata categories, wherein the second set of metadata categories is not associated with the first application.

17. The system of claim 13, wherein at least one metadata category in the first set of metadata categories is only associated with the first application.

18. The system of claim 13, wherein at least one metadata category in the first set of metadata categories is associated with a second application.

19. The system of claim 13, wherein at least one metadata category in the first set of metadata categories is associated with a first user.

20. The system of claim 19, wherein the communication processor is further configured to:
identify a second user associated with the request;
determine whether the second user is associated with the file; and
provide the filtered metadata to the first application in response to determining that the second user is associated with the file.

21. The system of claim 13, wherein the communication processor is further configured to edit metadata associated with the file in response to the request.

22. The system of claim 13, wherein metadata associated with at least one metadata category in the first set of metadata categories is a predetermined function of time.

23. The system of claim 13, wherein metadata includes a text string.

24. The system of claim 13, wherein metadata includes a numerical value.

25. The system of claim 13, wherein metadata includes a date and time.

26. The system of claim 13, wherein a first metadata category in the first set of metadata categories is associated with a second metadata category in the first set of metadata categories.

27. The system of claim 13, wherein:
the file database is further configured for storing a folder associated with one or more files and metadata associated with the folder, and
the communication processor is further configured to edit one or more metadata categories based on metadata associated with the folder.

28. The system of claim 13, wherein the communication processor is further configured to verify that the first application is authorized to access the file.

* * * * *